United States Patent [19]

Jackson et al.

[11] Patent Number: 5,255,452
[45] Date of Patent: Oct. 26, 1993

[54] METHOD AND MEANS FOR CREATING ANTI-GRAVITY ILLUSION

[75] Inventors: Michael J. Jackson, Los Angeles; Michael L. Bush; Dennis Tompkins, both of Hollywood, Calif.

[73] Assignee: Triumph International, Inc., Los Angeles, Calif.

[21] Appl. No.: 905,479

[22] Filed: Jun. 29, 1992

[51] Int. Cl.⁵ .......................... A43B 5/00; A43B 3/00
[52] U.S. Cl. .......................................... 36/113; 36/1; 36/136; 36/80; 36/132
[58] Field of Search ...................... 36/1, 80, 103, 113, 36/114, 131, 132, 136; 482/70, 71, 105

[56] References Cited

U.S. PATENT DOCUMENTS

| 1,059,284 | 4/1913 | Dennis | 36/114 |
| 2,114,790 | 4/1938 | Venables | 36/132 |
| 2,473,099 | 6/1949 | Hatch | 36/1 |
| 3,889,399 | 6/1975 | Emrich | 36/1 |
| 4,445,287 | 5/1984 | Garcia | 36/114 |
| 4,538,480 | 9/1985 | Trindle | 36/131 |
| 4,645,466 | 2/1987 | Ellis | 36/132 |
| 4,762,019 | 8/1988 | Beyl | 36/131 |
| 4,882,858 | 11/1989 | Signori | 36/131 |
| 5,042,173 | 8/1991 | Blizzard et al. | 36/113 |

Primary Examiner—Steven N. Meyers
Assistant Examiner—M. Denise Patterson
Attorney, Agent, or Firm—Drucker & Sommers

[57] ABSTRACT

A system for allowing a shoe wearer to lean forwardly beyond his center of gravity by virtue of wearing a specially designed pair of shoes which will engage with a hitch member movably projectable through a stage surface. The shoes have a specially designed heel slot which can be detachably engaged with the hitch member by simply sliding the shoe wearer's foot forward, thereby engaging with the hitch member.

13 Claims, 4 Drawing Sheets

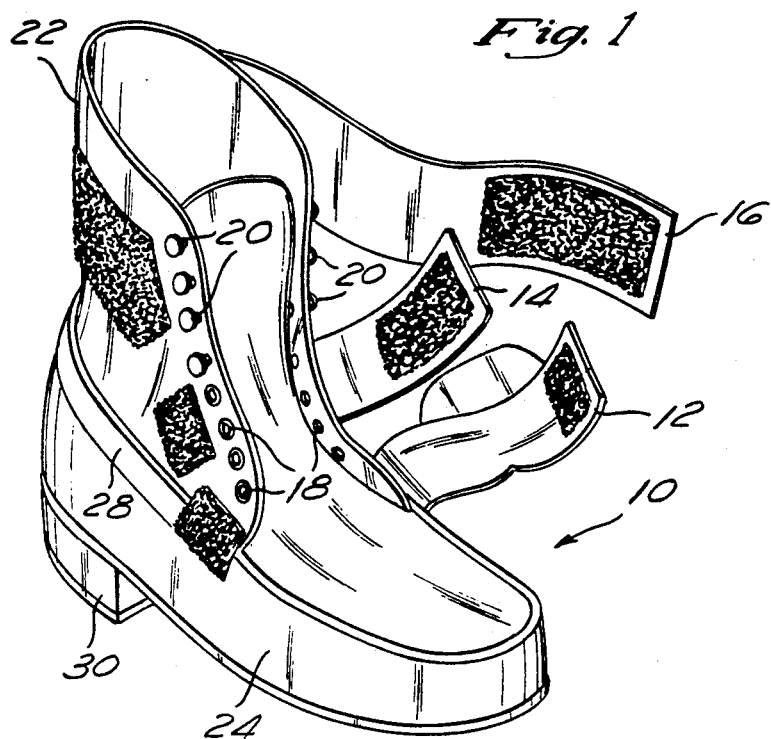
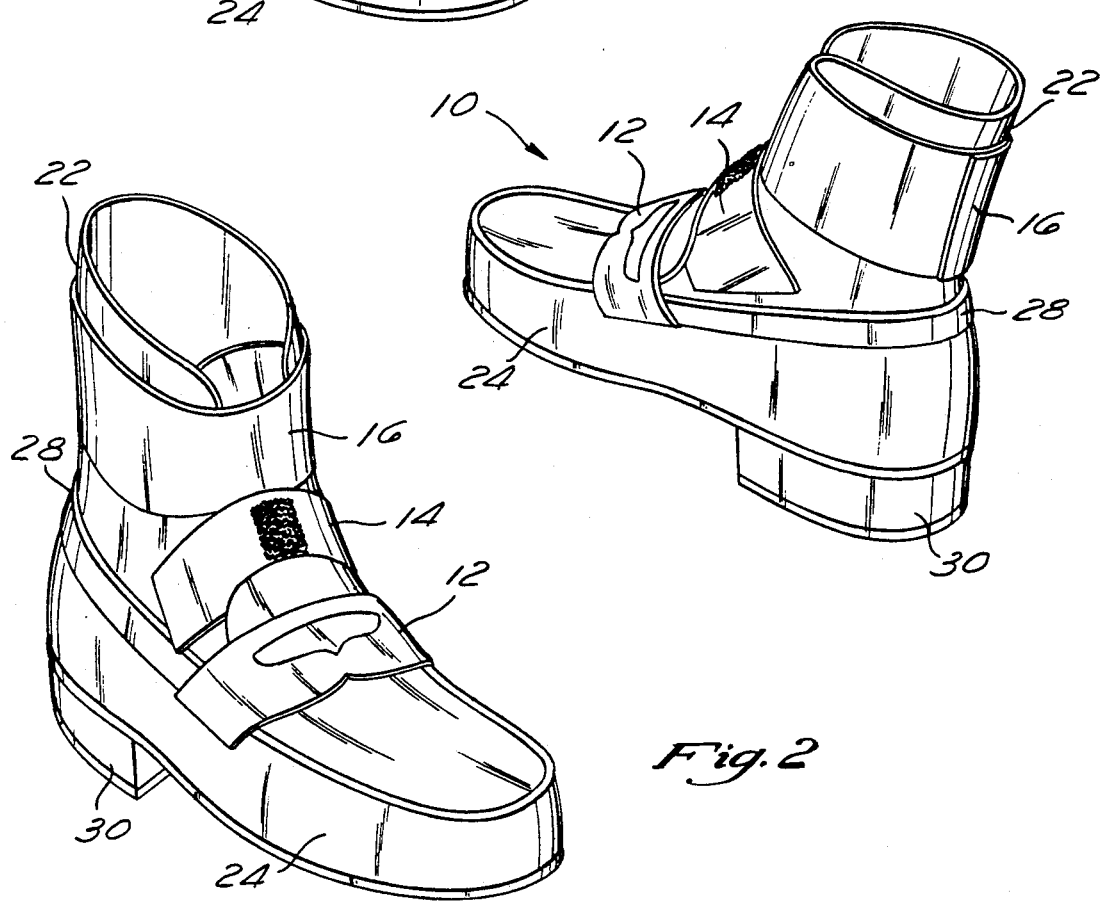

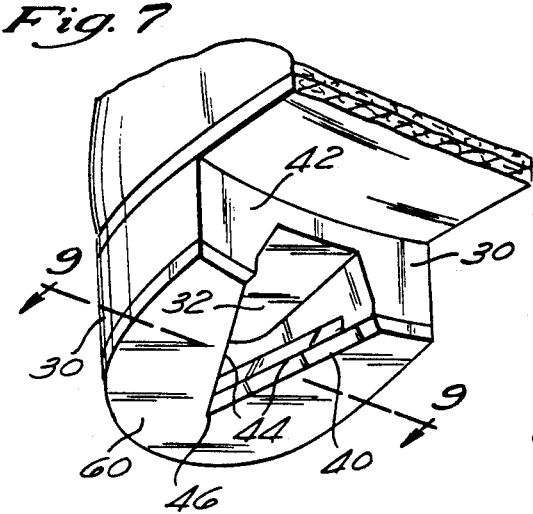
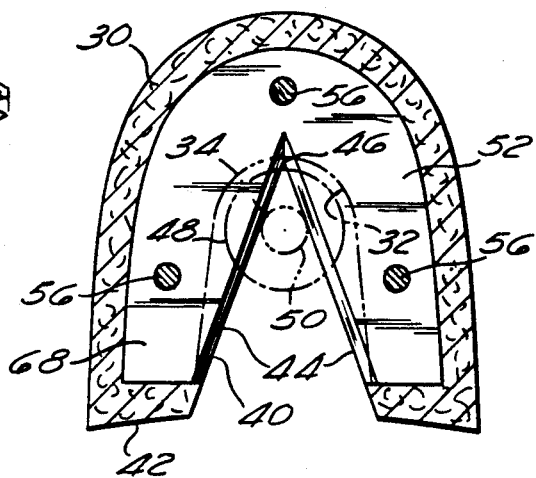
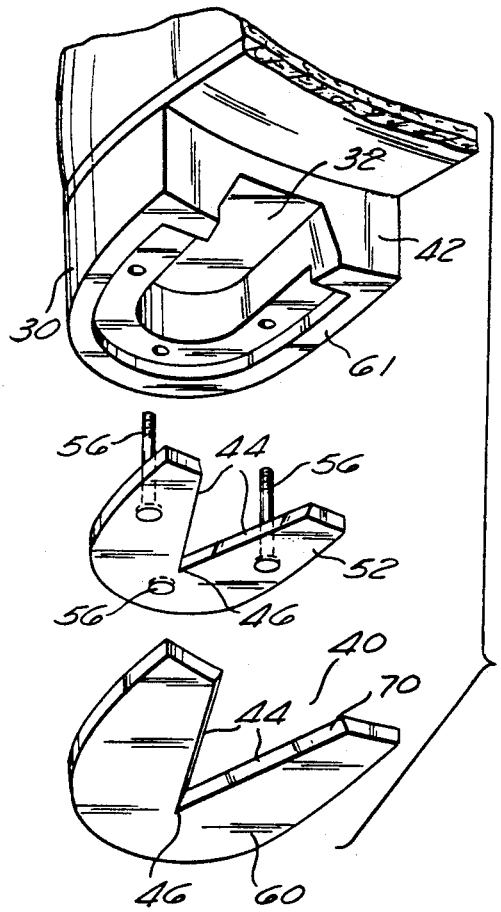
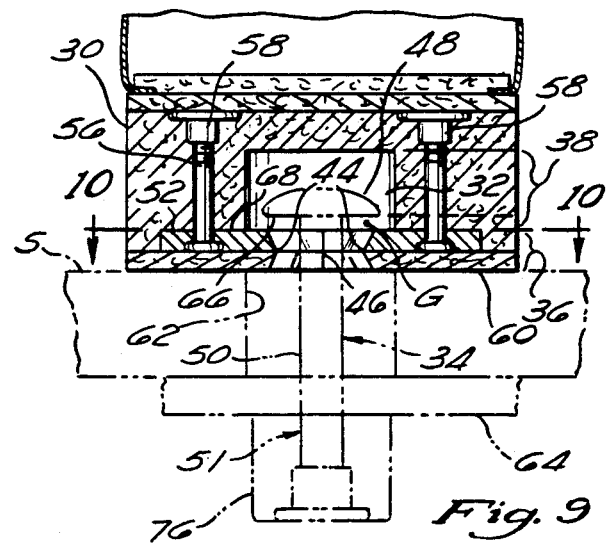

METHOD AND MEANS FOR CREATING ANTI-GRAVITY ILLUSION

BACKGROUND OF THE INVENTION

1. Field of the Invention

This invention relates to a method and means for creating an anti-gravity illusion effects for entertainment purposes.

This invention relates more particularly to the creation of such illusion by means of specialized footwear and accessories therefor. The specialized footwear is provided with means for engagement with a movably protrudable hitch or post which allows the entertainer to lean forward on a stage at a very acute angle relative to the stage floor to achieve the illusion of defying gravity.

2. Description of the Prior Art

Music entertainers and dancers are constantly searching for new and interesting elements which can be incorporated into their musical and dance performances. Interesting stage design, lighting, fog generators, laser light shows, and large video screens all enhance the appealability of live and recorded performances. Many popular music and dance entertainers expend great efforts in enhancing and choreographing their performances and dancing.

In the past, a professional entertainer, one of the inventors herein, has incorporated dance steps in his recorded video performances, wherein he and other dancers would lean forward beyond their center of gravity, thereby creating an impressive visual effect. This effect was accomplished by the use of cables connecting a harness around the dancer's waist with hooks on a stage, thereby allowing the dancer to lean forward at the required degree. However, since this requires stagehands to connect and then disconnect the cables, it has not been possible to use this system in live performances. Moreover, the cables obviously restricted arm and body movements.

There is disclosed in the prior art footwear which allow the wearer to engage his or her shoes with a stationary object. U.S. Pat. No. 5,042,173 to Blizzard, et al. discloses footwear which can be worn by astronauts and which can be detachably engaged with a rail fixed to a surface to aid astronauts in working in a zero gravity environment. U.S. Pat. No. 1,165,812 to Staubly discloses a rubber overshoe which has a hook on its sole which can be engaged with a plate fixed to a surface to assist in removing the overshoe without having to bending down and touching the overshoes.

However, to the best of our knowledge and belief the prior art does not disclose or suggest the specialized footwear permitting an entertainer to freely move about a stage, while at the same time, enabling engagement with a movable hitch or post, projectable through the stage floor, to enable the illusion to be performed.

SUMMARY OF THE INVENTION

The present invention overcomes the above noted deficiencies of the previously employed cable system by providing specialized footwear and a moveable hitch or post to which the specialized footwear can be detachably engaged to allow the footwear wearer to lean forward on the stage, with his or her center of gravity well beyond the front of the shoes, thereby creating the desired visual effect.

The invention provides a new design for shoes which will allow his or her performing artist, by engaging the shoes onto an upstanding post positioned to project upwardly from a stage at a predetermined time, to lean forwardly to put his or her center of gravity beyond the front or rear of his shoes, thereby creating the desired gravity defying interesting visual effect.

The invention provides a system for engaging footwear with a hitch or post means, comprising:
  shoes having a first engagement means; and
  a second engagement means being movably protrudable through a stable surface (usually a stage platform) between a first stable protruding position raised above the stable surface and a second retracted position lowered below, or flush with, the stable surface. The first engagement means is engageable with the said second engagement means when said second engagement means is in the first stable protruding position. The second retracted position is preferably flush with the stable surface so as not to impede the performer in any way in his movements and dance before and after the hitch or post is exposed in the first protruding position.

BRIEF DESCRIPTION OF THE DRAWINGS

The invention is described below in greater detail with reference to the drawing:

FIG. 1 is a front perspective view of specialized footwear, viz. a shoe of the invention with its fastening straps opened;

FIG. 2 is a front perspective view of the shoe of FIG. 1, shown with its fastening straps closed;

FIG. 3 is rear perspective view of the shoe of FIG. 1 with its straps closed;

FIG. 7 is a bottom perspective view of the heel of the shoe;

FIG. 8 is an exploded bottom view of the heel of the shoe;

FIG. 9 is a partial front cross-sectional view of the heel of the shoe and the hitch, taken along lines 9—9 of FIG. 7;

FIG. 10 is a transverse sectional view along lines 10—10 of FIG. 9;

DESCRIPTION OF THE PREFERRED EMBODIMENT

Figure 4:
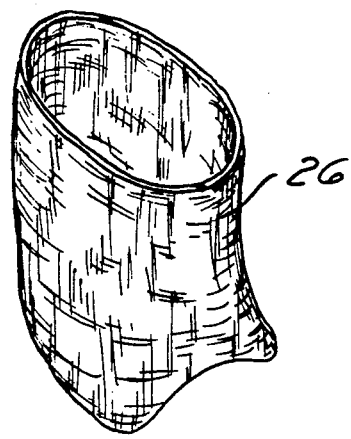
FIG. 4 is perspective front view of a sock covering section.
Figure 5:
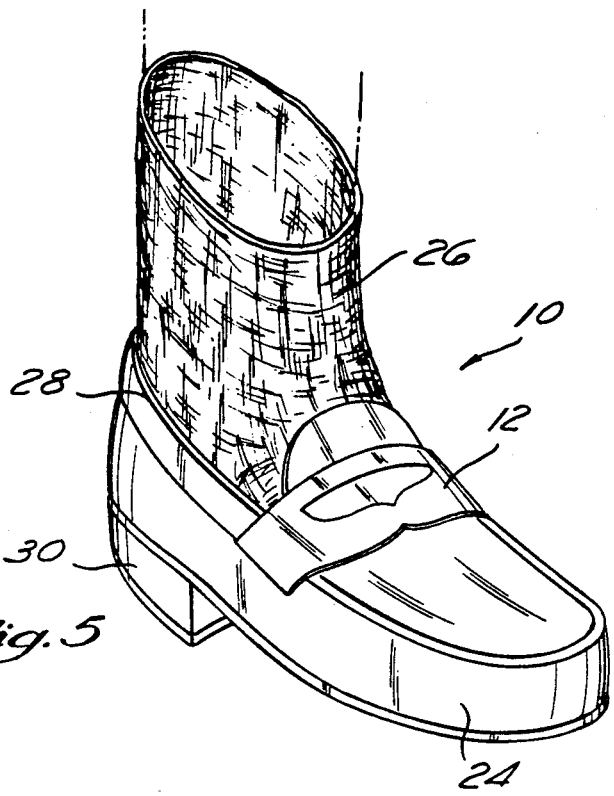
FIG. 5 is a perspective front view of the shoe with the sock covering section of FIG. 4 in place.
Figure 6:
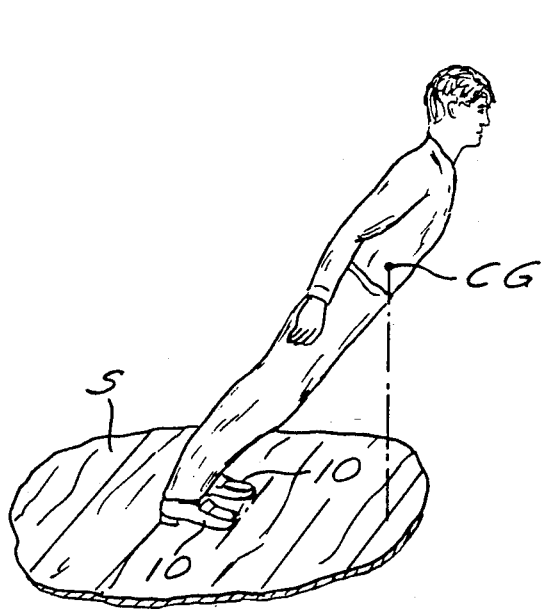
FIG. 6 is a side perspective view of a dancer wearing the shoes, shown leaning forward beyond his center of gravity.

Referring now to the drawings, there is illustrated, in FIG. 1, a front perspective view of the shoe 10 utilized in this invention, with fastening straps 12, 14, and 16 (not fastened) to reveal lacing eyelets 18 and lacing hooks 20. The shoe 10 rides relatively high on the wearer's ankles, as shown in FIG. 2 and 3, and can be snugly secured around the wearer's ankles by use of the straps 12, 14 and 16 and/or shoe laces (not shown) which can be tightly laced through the eyelets 18 and lacing hooks 20. The use of shoe laces provides for a snugger fit than by the straps 12, 14 and 16 straps, but the use of straps 12, 14 and 16 allows the shoes 10 to be put on and removed more quickly as timing, for this particular "move," may be extremely critical and of short duration. In order to conceal the nature of the shoes 10, the front of strap 12 can be made to appear as the tongue and strap of a penny loafer. Spats (not shown) or pant legs can be used to cover the upper part 22 of the shoes 10, as best shown in FIG. 6, and the lower part 24 of the shoe 10 will thus be made to appear as a normal walking or dance shoe. Also, as shown in FIGS. 4 and 5, an upper sock section 26 can be used to conceal the upper part 22 of the shoe 10, the sock section 26 fitting around a peripheral edge 28 of the shoe 10.

Referring to FIGS. 7-10, the heels 30 of the shoes 10 have a recess 32 formed therein adapted to detachably receive a hitch or post 34, thereby locking the heels 30 of the shoes 10 in place relative to the stage surface S through which the hitch 34 protrudes. A V-shaped guide 40 is located below recess 32, with the mouth of the V located at the leading edge 42 of the heel 30. The guide 40 forms the entrance to the recess 32. The front of the V-shaped guide 40 lies flush with the leading edge 42 of the heel 30. Edges 44, forming the V-shaped guide 40 terminate rearwardly of leading edge 42 at a terminal end point 46.

The V-shaped slot 40 is formed in the lower region 36 of the heel, preferably by two layers of materials, an outer or exposed layer 60, preferably made of leather, and an inner overlying layer, preferably consisting of a metal plate 52. The upper region 38 of the heel, above the metal plate layer 52 has the hitch-post receiving recess 32 formed therein. The metal plate 52 is affixed to the heel portion of the shoe, as described hereafter.

Referring to FIGS. 9-12 the shoe hitch 34 preferably comprises a pair of steel bolts, each bolt 51 having an enlarged preferably rounded head 48 relative to its shank 50. Enlarged bolt head 48 has a diameter less than the width of the recess 32. The bolt shank 50 is of somewhat less diameter than the mouth of the V-shaped guide 40. The head 48 is wider than the terminal end point 46 of the V-shaped guide 40. The recess 32 is formed so that it is wider than the head 48 of the hitch 34.

As shown in FIGS. 9 and 10, when the heel 30 of the shoe is placed over the bolt head 48 so that the mouth of the V-shaped slot 40 overlies the head 48, the heel 30 may then be lowered and slid forwardly until the shank 50 of the hitch 34 contacts both edges 44 of the V-shaped guide 40. The bolt head 48 will lie in recess 32 above said V-shaped slot guide 40, and the shoe will be stably positioned relative to the stage floors. Three countersunk bolts 56 and threaded inserts 58 can be used to assure reliable affixation of the metal plate 52 of the heel 30 to the rest of the shoe 10. The exposed outer layer 60 of the heel is affixed to the perimeter 61 of the heel (outlying the metal plate 52) by suitable conventional adhesive and/or tacking means (not shown).

Figure 11:
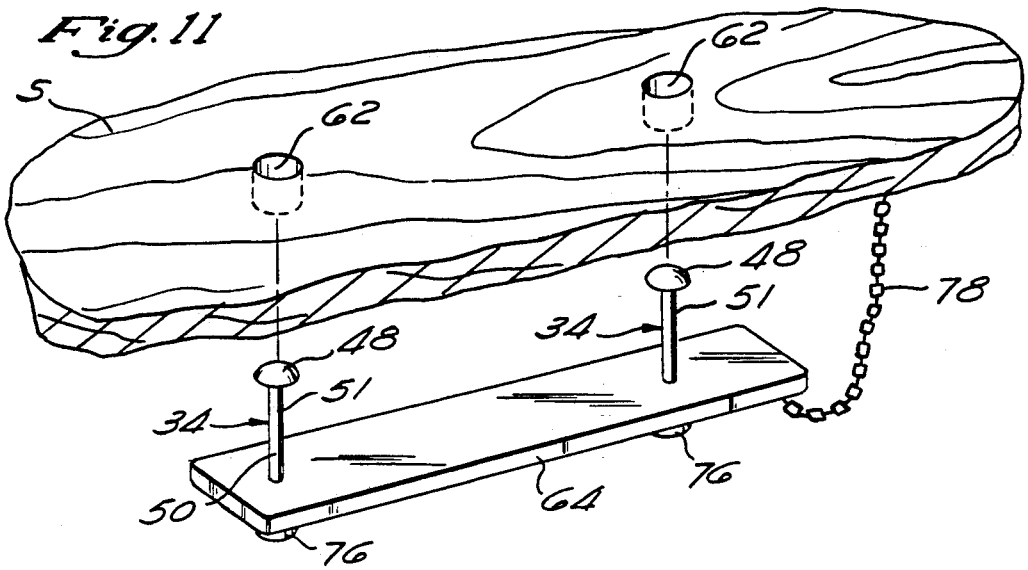
FIG. 11 is a perspective view, in partial cross-section of the hitches or posts attached to a plate, shown in alignment with holes in a stage surface.
Figure 12:
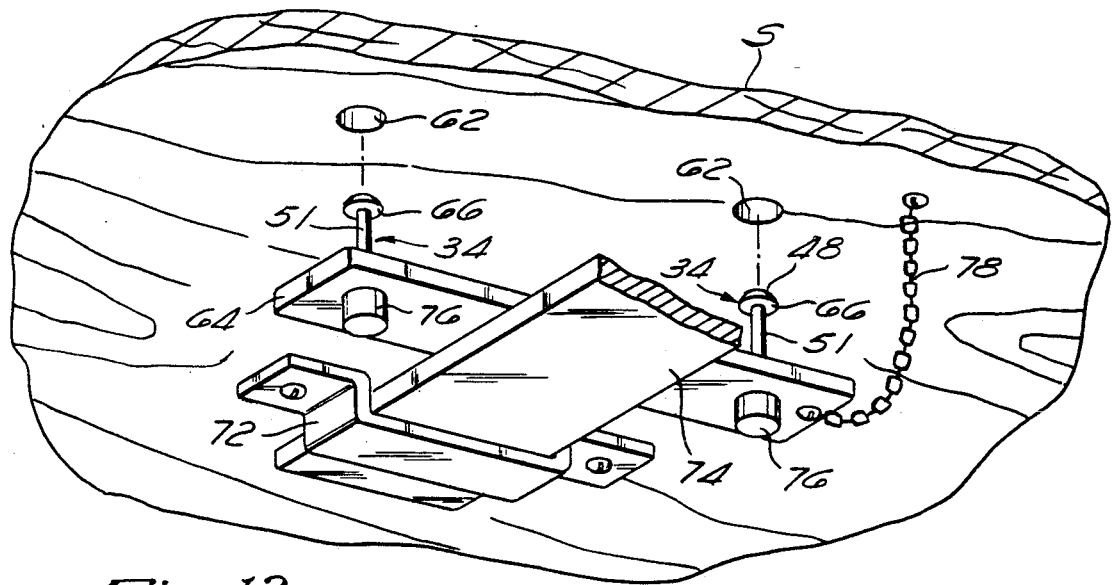
FIG. 12 is a perspective view of the hitch carrying plate of FIG. 11 and a stage engagement mechanism to secure the plate against the underside of the stage surface.

Referring to FIGS. 9, 11 and 12, the bolts 51 of the hitch 34 are made to be movably protrudable through holes or openings 62 formed through the stage surface S. The holes 62 are oversized so as to allow the bolt heads 48 to freely pass therethrough. The bolts 51 are permanently affixed to a metal plate 64, and the length of the bolt shank 50 of the bolts is such that when the metal plate 64 carrying the bolts is stably placed against the underside of the stage surface S, the head 48 will be spaced sufficiently high off the stage surface S so that the bottom edge 66 of the head 48 will clear the top edge 68 of the metal plate 52, leaving a slight gap G. This slight gap G will allow the entertainer to slide his or her shoes 10 forward to engage the head 48 of the hitch 34 with the V-shaped slot 40. It has been found that a gap G of approximately one-eighth of an inch is ideal for lighter dancers, while slightly deeper gaps are required for heavier dancers. Also, referring again to FIG. 9, the metal plate 60 is formed so that its V-shaped slot edges and the V-shaped edges 70 of the heel covering material 60 form flush V-shaped edges 44. The V-shaped guide 40, so formed, is preferred, as it minimizes the chances of the hitch 34 inadvertently becoming jammed in the V-shaped guide, and thereby preventing the shoe 10 from being disengaged from the hitch 34 after the "anti-gravity" move is completed.

Turning again to FIGS. 11 and 12, a simple mechanical means can be used to stabilize the metal plate 64 with its bolts 51 relative to the stage surface S. For this purpose, slide brackets 72 are affixed to the underside of the stage surface S. After the metal plate 64 is positioned and bolts 51 aligned with openings 62, one or more metal support bars 74 can be slid into the sliding brackets 72, and under the metal plate 64, to hold the plate 64 tightly against the underside of the stage surface S. Also, as is shown in FIGS. 9, 11 and 12, if it is desired to plug the holes 62 in the stage surface S when the hitches 34 are withdrawn, plug protrusions 76 can be provided on another side of the metal plate 64. When the metal plate 64 is oriented with the plug protrusions 76 directed upwardly, the metal plate 64 can be immobilized relative to the stage surface. The plug protrusions 76 will be just long enough so that they lie essentially flush with or the stage surface S. A chain 78 or other means may be used to retain the metal plate 64 to the underside of the stage surface S, if desired.

Figure 13:
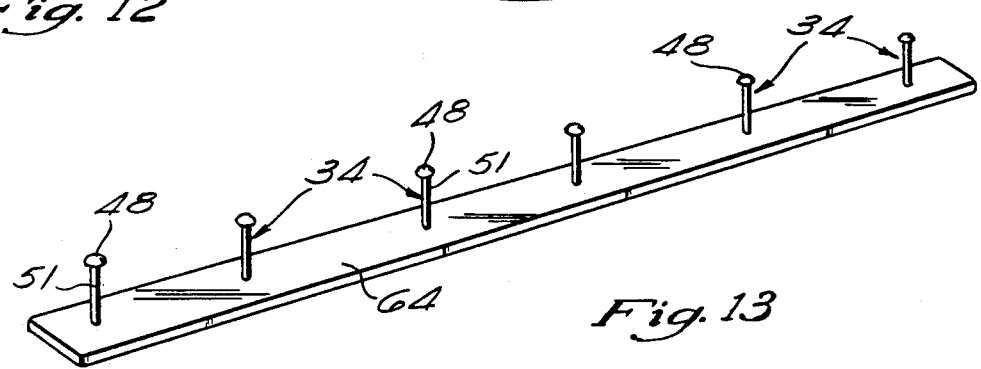
FIG. 13 is a perspective view of a hitch carrying plate with three pairs of hitches or posts affixed thereto.

Referring to FIG. 13, multiple pairs of hitches 34 can be provided on a single metal plate 64, if desired.

In lieu of the mechanical means, alternate mechanisms can be provided to raise and lower the hitches by pneumatic, electromagnetic, hydraulic, other mechanical means, or by any other known means. As presently contemplated, the hitch 34 will be raised and lowered by stage personnel stationed under the stage surface S. The inventors also contemplate that the hitch 34 could also be raised by the entertainer himself or herself by remote control means, such as by radio control, when automated means is used to raise and lower the hitches 34.

When the hitch 34 is locked in its raised position, the performer can engage his or her heels 30 with the hitch 34, and he or she can then safely lean forward as far as he or she desires and is capable of, so that his or her center of gravity CG lies in front of the shoes 10, as shown in FIG. 6. After returning to a normal standing position, the dancer can slide his or her shoes 10 rearwardly, thus readily disengaging from the hitches 34. Thereafter, the hitches 34 can be pulled out of the holes 62 in the stage and plugged, if desired.

Figure 14:
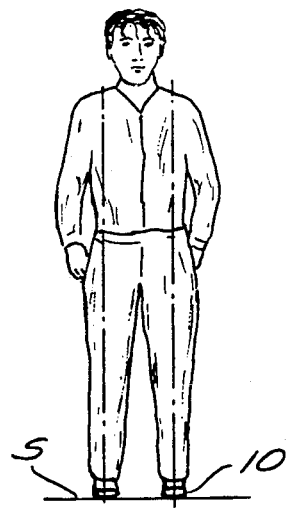
FIG. 14 is a front elevational view of a performing artist wearing the shoes of this invention, showing the optimum spacing of the pair of hitches relative to the shoulders of the performing artist.

Referring to FIG. 14, it has been found that the pair of hitches 34 should ideally be spaced between the shoulder blades of a dancer, a width of approximately 14–20" apart. Such a spacing provides maximum stability during the leaning.

The drawings and the foregoing description are not intended to represent the only form of the invention in regard to the details of this construction and manner of operation. In fact, it will be evident to one skilled in the art that modifications and variations may be made without departing from the spirit and scope of the invention. Although specific terms have been employed, they are intended in a generic and descriptive sense only and not for the purpose of limitation, the scope of the invention being delineated in the following claims:

I claim:

1. A system for engaging shoes with a hitch mans to permit a person standing on a stage surface to lean forwardly beyond his or her center of gravity, comprising:
    at least one shoe having a heel with a first engagement means, said first engagement means comprising a recess formed in a heel of said shoe covered with a heel slot plane located at a bottom region of said heel, said heel slot plate having a slot formed therein with a relatively wide opening at a leading edge of said heel and a narrower terminal end rearward of said leading edge, said recess being larger in size above said terminal end of said slot than is said terminal end of said slot; and
    a second engagement means, detachably engageable with said first engagement means, comprising a hitch member having an enlarged head portion connected by a narrower shank portion to a means for raising and lowering said head of said hitch member above and substantially level with or below said stage surface, said head portion being larger in size than said terminal end of said slot and said shank portion being narrower than said terminal end of said slot, wherein said hitch member can be moved through apertures in said stage surface between a projecting position raised above said stage surface and a retracted position at or below the stage surface, and when said head portion of said hitch member is raised above said stage surface, said first engagement means can be detachably engaged with said projecting hitch member, thereby allowing a person wearing the shoes to lean forwardly with his or her normal center of gravity beyond a front region of said shoes, and maintain said forward lean.

2. The system of claim 1, wherein said slot in said heel slot plate is V-shaped, with the mouth of the V at the leading edge of said heel.

3. The system of 1, wherein said shoe has strapping means to secure the shoe to the wearer's feet.

4. The system of claim 1, wherein said shoe has lace means to secure the shoe to the wearer's feet.

5. The system of claim 1, wherein said shoe has extension means overlying the wearer's ankle, and is provided with covering means to conceal the said extension means of said shoe.

6. The system of claim 5, wherein said covering means comprises a sock-like covering.

7. A system for engaging shoes with a hitch means to permit a person standing on a stage surface to lean forwardly beyond his or her center of gravity in a stable manner, comprising:
    at least one shoe having a heel with a first engagement means, said first engagement means comprising a recess formed in a heel of said shoe, said recess having a relatively wide opening at a leading edge of said heel and a narrower terminal end rearward of said leading edge; and
    a second engagement means, detachably engagable with said first engagement means, comprising a hitch member having an enlarged head portion, connected to a means for raising and lowering said hitch member above and substantially level with or below said stage surface, wherein said hitch member can be moved through apertures in said stage surface between a projecting position raised above said stage surface and a retracted position at or below the stage surface, and when said hitch member is raised above said stage surface, said first engagement means is detachably engagable with said projecting hitch member, thereby allowing a person wearing the shoes to lean forwardly with his or her normal center of gravity beyond a front region or said shoes, and maintain said forward lean.

8. The system of claim 7, wherein said recess is covered with a heel slot plate located at a bottom region of said heel, said heel slot plate having a slot formed therein.

9. The system of claim 8, wherein said slot in said heel slot plate is V-shaped, with the mouth of the V at the leading edge of said heel.

10. The system of claim 7, wherein said shoe has strapping means to secure the shoe to the wearer's feet.

11. The system of claim 7, wherein said shoe has lace means to secure the shoe to the wearer's feet.

12. The system of claim 7, wherein said shoe has extension means overlying the wearer's ankle, and is provided with covering means to conceal the said extension means of said shoe.

13. The system of claim 12, wherein said covering means comprises a sock-like covering.

* * * * *